(12) United States Patent
Baudesson et al.

(10) Patent No.: US 7,545,114 B2
(45) Date of Patent: Jun. 9, 2009

(54) PARAMETERIZATION METHOD FOR A CONVERTER AND CONVERTER IMPLEMENTING THE METHOD

(75) Inventors: Philippe Baudesson, La Boissiere (FR); Stefan Capitaneanu, Mousseaux Neuville (FR); Philippe Loizelet, Le Plessis Hebert (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 60 days.

(21) Appl. No.: 11/679,441

(22) Filed: Feb. 27, 2007

(65) Prior Publication Data

US 2007/0210847 A1    Sep. 13, 2007

(30) Foreign Application Priority Data

Mar. 13, 2006    (FR) .................................. 0650843

(51) Int. Cl.
*H02P 23/00* (2006.01)

(52) U.S. Cl. .................. 318/799; 318/798; 318/767; 318/727; 327/283

(58) Field of Classification Search ............... 318/799, 318/798, 767, 727; 363/41, 43, 98; 327/283
See application file for complete search history.

(56) References Cited

U.S. PATENT DOCUMENTS

| | | | | |
|---|---|---|---|---|
| 5,621,623 A * | 4/1997 | Kuriyama et al. | ............. | 363/20 |
| 5,671,130 A * | 9/1997 | Kerkman et al. | ............. | 363/41 |
| 5,831,842 A * | 11/1998 | Ogasawara et al. | ........... | 363/40 |
| 6,151,228 A * | 11/2000 | Miyazaki et al. | ............... | 363/48 |
| 6,459,597 B1 * | 10/2002 | Igarashi et al. | ................. | 363/39 |
| 6,469,485 B2 * | 10/2002 | Cheng et al. | ................. | 323/286 |
| 6,636,107 B2 * | 10/2003 | Pelly | ........................ | 327/552 |
| 6,690,230 B2 * | 2/2004 | Pelly | ........................ | 327/552 |
| 6,788,558 B2 * | 9/2004 | Pelly | ........................ | 363/40 |
| 6,859,374 B2 * | 2/2005 | Pollanen et al. | ............... | 363/69 |
| 6,898,092 B2 * | 5/2005 | Briere et al. | ................. | 363/39 |
| 7,187,229 B2 * | 3/2007 | Pelly | ........................ | 327/551 |
| 2004/0207463 A1 * | 10/2004 | Pelly | ........................ | 327/552 |

FOREIGN PATENT DOCUMENTS

EP    1 580 873 A1    9/2005

* cited by examiner

*Primary Examiner*—Lincoln Donovan
*Assistant Examiner*—David S Luo
(74) *Attorney, Agent, or Firm*—Oblon, Spivak, McClelland, Maier & Neustadt, P.C.

(57) ABSTRACT

The present invention relates to a parameterization method for a converter (1, 2) of the speed controller type, the said converter (1, 2) being connected to an electrical load (3) by means of an electrical cable (4) comprising at least two conductors, the method consisting in:
  generating common-mode current on the electrical cable (4) starting from a pulsed voltage comprising a first voltage edge (11, 13) and a second voltage edge (12, 14) delayed by a delay time (T) with respect to the first voltage edge (11, 13),
  measuring the common-mode current generated,
  making the delay time (T) between the two voltage edges (11, 12, 13, 14) generated vary, and determining an optimal delay time (T2) starting from a quantity (Ipeak, Ieff) representative of the common-mode current measured for the various values of the delay time (T).

16 Claims, 10 Drawing Sheets

PARAMETERIZATION METHOD FOR A CONVERTER AND CONVERTER IMPLEMENTING THE METHOD

BACKGROUND OF THE INVENTION

1. Field of the Invention

The present invention relates to a parameterization method for a converter of the speed controller type and a converter implementing the method. This parameterization method aims notably to determine certain parameters of the electrical cable connecting the converter to the electrical load.

A converter of the speed controller type is connected to an electrical load by means of an electrical cable and notably comprises a voltage inverter, for example of the PWM (Pulse-Width Modulation) type, associated with an uncontrolled rectifier and a capacitive filter. The converter supplies a pulsed voltage, comprising rising and falling voltage edges, to the electrical load.

The PWM control of the electrical load is influenced by the characteristics of the electrical cable connecting the speed controller to the electrical load. For example, if the cable is very long, the electrical load is subject to over-voltages due to the reflections of the voltage edges on the load (see FIG. 1). These reflections are caused by the impedance discontinuities occurring between the electrical load and the electrical cable and between the electrical cable and the converter. The voltage oscillations are more particularly due to the forward and backward propagation of the voltage edges on the electrical cable.

The frequency of these oscillations therefore depends on the propagation time of a voltage edge on the cable, the propagation time being itself dependent on the length of the cable and the nature of the cable.

2. Description of the Prior Art

A converter control device and method are known from the document EP1580873 (or US 2005207194) that allow the over-voltages across the terminals of the electrical load to be limited during its normal operation, the said over-voltages being associated with the wave reflections occurring between the converter and the motor. The idea in this document is to generate, by means of a multi-level converter of the NPC (Neutral Point Clamped) type, a pulsed voltage with three voltage levels, comprising two successive voltage edges, the transmission of the second voltage edge being delayed by a certain time with respect to the first voltage edge. The first voltage edge is for example created between a first low or zero value and an intermediate value. After a certain delay time during which the voltage is held at the intermediate value, the second voltage edge is transmitted between the intermediate value and a final value higher than the intermediate value. The delay observed between the first voltage edge and the second voltage edge allows the oscillations and the interference generated by the first voltage edge to be compensated.

In order to minimize the over-voltages across the terminals of the electrical load, the delay time to be observed between the transmission of two voltage edges must be optimal. This delay time depends on the length and on the characteristics of the cable. Cables that are all ostensibly identical do not therefore necessarily generate identical over-voltages across the terminals of the electrical load. In the aforementioned document, the optimal delay time is determined from the characteristics of the cable given by the manufacturer, by time measurement when the installation is powered up or automatically by measuring the propagation time of a voltage edge on the cable. However, this document does not propose any precise solution for determining this delay time exactly.

SUMMARY OF THE INVENTION

The object of the invention is to provide a parameterization method for the converter that allows this optimal delay time to be automatically determined so as to be able to precisely adapt the PWM control of the electrical load to the real characteristics of the cable.

This object is achieved by a parameterization method for a converter of the speed controller type, the said converter being connected to an electrical load by means of an electrical cable comprising at least two conductors, the method being characterized in that it consists in:

generating common-mode current on the electrical cable starting from a pulsed voltage delivered by the converter to the electrical load, the pulsed voltage comprising a first voltage edge and a second voltage edge delayed by a delay time with respect to the first voltage edge, measuring the common-mode current generated, varying the delay time between the two voltage edges generated, determining and storing an optimal delay time starting from a quantity representative of the common-mode current measured for the various values of the delay time.

According to a first embodiment of the invention, the first voltage edge is generated on one conductor of the cable between an initial value and an intermediate value and the second voltage edge is generated on the same conductor of the cable, in the same pulse direction and offset by the delay time, between the intermediate value and a final value.

According to a second embodiment, the first voltage edge is generated on a first conductor of the cable between an initial value and a final value and the second voltage edge is generated on a second conductor of the cable, in the same pulse direction and offset by the delay time, between the initial value and the final value.

According to the invention, the quantity representative of the common-mode current is the peak intensity of the common-mode current. In this case, the optimal delay time is determined by detecting the slope break point of the peak intensities determined when the delay time increases.

According to the invention, the quantity representative of the common-mode current can also be the r.m.s. (root mean square) intensity of the common-mode current. In this case, the optimal delay time is determined by detecting the minimum of the r.m.s. intensities determined for each value of delay time observed.

According to one feature, the method of the invention allows the propagation time of the cable to be determined from the optimal delay time obtained.

According to another feature, the method of the invention consists in determining the length of the cable from the optimal delay time obtained. The propagation time together with the length of the cable are then stored in the converter.

Another object of the invention is to provide a converter capable of implementing the method described hereinabove.

This object is achieved by a converter of the speed controller type which can be connected to an electrical load by means of an electrical cable comprising at least two conductors, the said converter being characterized in that it comprises:

means for generating common-mode current starting from a pulsed voltage delivered to the said electrical load, the said pulsed voltage comprising a first voltage edge and a second voltage edge delayed by a delay time with respect to the first voltage edge, means for measuring the common-mode current generated, means for varying the delay time between the two voltage edges generated, and means for determining and for storing an optimal delay time starting from a quantity representative of the common-mode current measured for the various values of delay time.

According to a first embodiment of the invention, the converter has three or more levels. The first voltage edge is generated on one conductor of the cable between an initial value and an intermediate value, and the second voltage edge is generated on the same conductor of the cable, in the same pulse direction and offset by the delay time, between the intermediate value and a final value. The measurement means then comprise a current sensor placed on the conductor of the electrical cable.

According to a second embodiment of the invention, the converter has two or more levels. In this case, the first voltage edge is generated on a first conductor of the cable between an initial value and a final value and the second voltage edge is generated on a second conductor of the cable, in the same pulse direction and offset by the delay time, between the initial value and the final value. The measurement means may then comprise a current sensor placed on one of the two conductors of the cable or a current sensor placed on each of the two conductors of the cable, a summer being used for adding together the common-mode currents measured on each of the conductors.

According to the invention, the determination means may comprise a detector of the peak intensity of the common-mode current measured for each delay time value. In this case, the optimal delay time is the delay time corresponding to the slope break point of the peak intensities detected when the delay time increases.

According to the invention, the determination means may comprise a detector of the r.m.s. intensity of the common-mode current measured for each delay time value. In this case, the optimal delay time is the delay time corresponding to the minimum of the r.m.s. intensities determined for each value of delay time.

According to the invention, the converter may comprise means for determining and for storing the propagation time of the cable, together with the length of the cable, starting from the optimal delay time obtained.

The optimal delay time determined can be directly used in the PWM control of the load in order to minimize the over-voltages across the terminals of the machine by following the method described in the aforementioned prior art patent application. Using this optimal delay time, the propagation time of a voltage edge on the cable, together with the length of the cable, can also be determined. Knowing these various parameters, it is possible:
  to adapt the PWM control,
  to choose filters protecting against over-voltages and/or leakage currents (EMI, sine, dv/dt filter) or
  to correct for certain parameters of the load such as the stator resistance.

BRIEF DESCRIPTION OF THE DRAWINGS

Other features and advantages will become apparent in the detailed description that follows referring to one embodiment given by way of example and depicted by the appended drawings in which.

DETAILED DESCRIPTION

Figure 1:
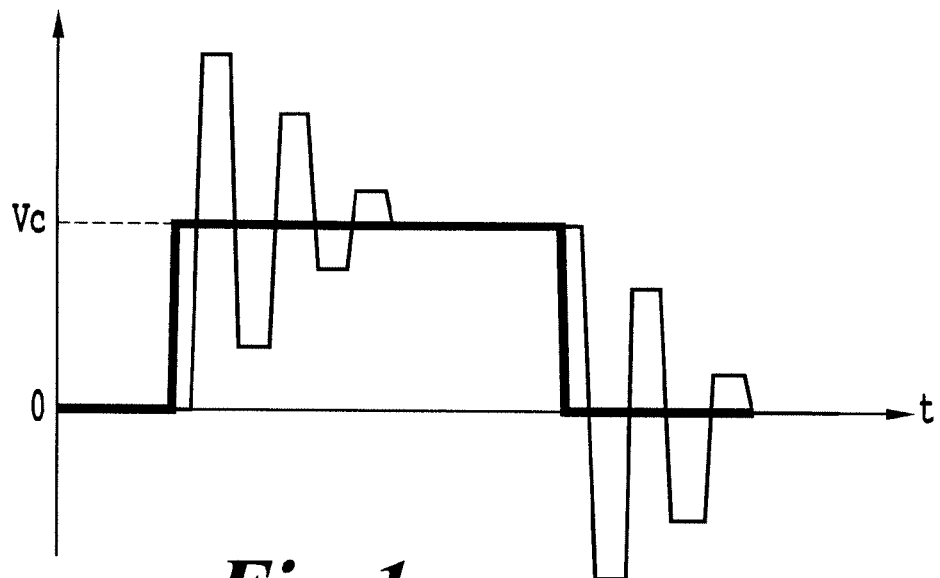
FIG. 1 shows a plot of the voltage signal produced by a two-level converter and the voltage oscillations generated by this voltage signal on the electrical cable.
Figure 2:
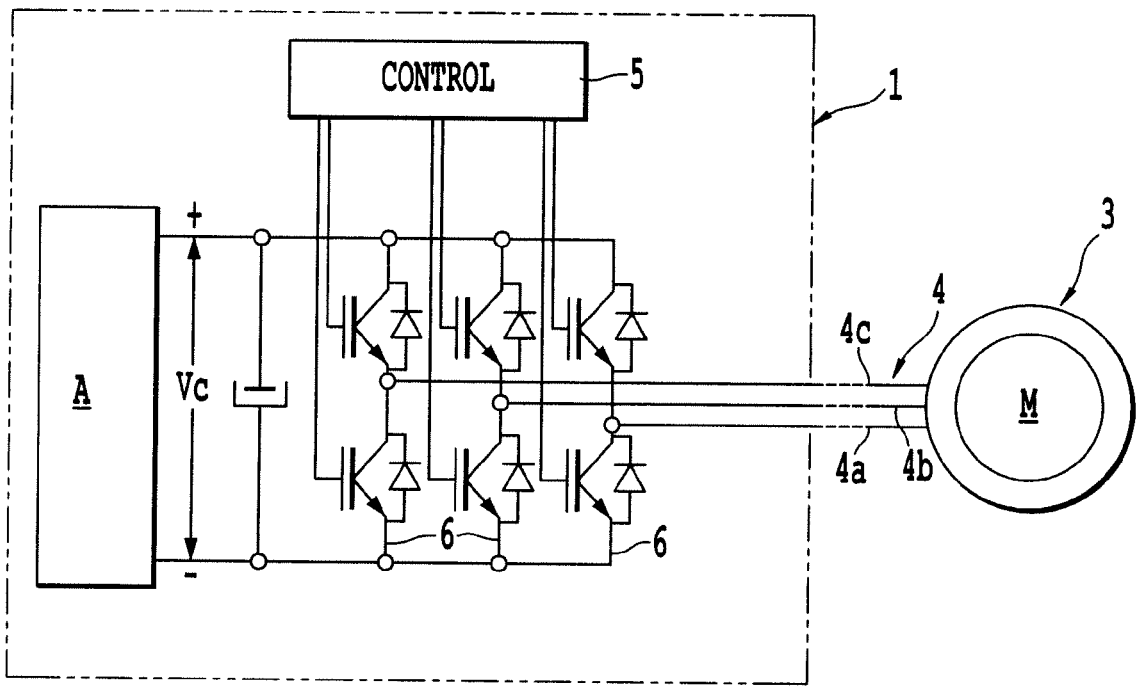
FIG. 2 shows a circuit diagram of an installation comprising a two-level converter.
Figure 3:
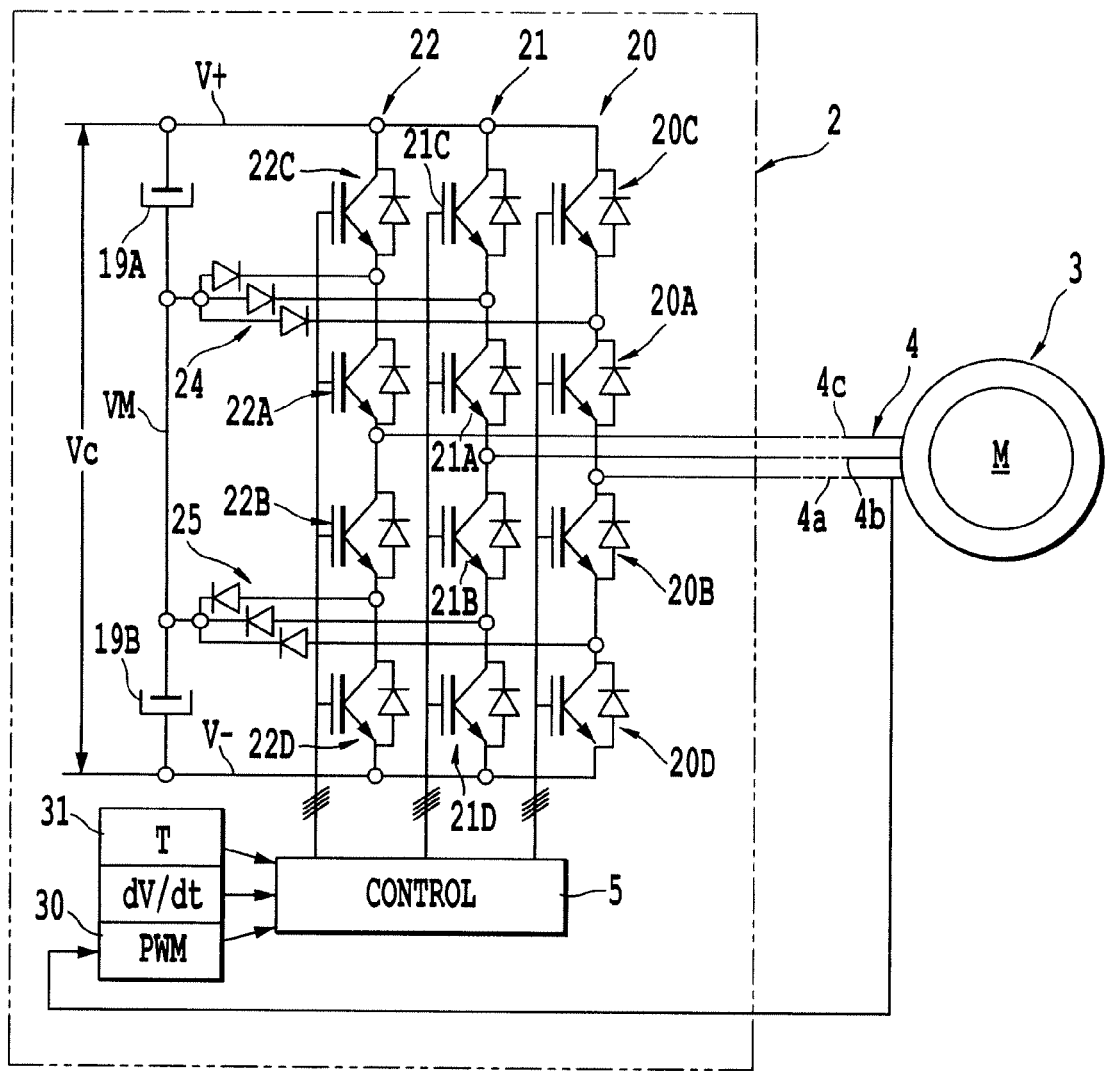
FIG. 3 shows a circuit diagram of an installation comprising a three-level converter of the NPC type.

FIGS. 2 and 3 show the structures of a converter with two-levels (1, FIG. 2) or with three levels (2, FIG. 3) of the speed controller type for an electrical load 3. A converter 1, 2 typically comprises power semiconductors for chopping an electrical DC voltage Vc in PWM (Pulse Width Modulation) mode. The structure of such a converter 1, 2 is generally composed of a rectifier or of a power supply A having an input connected to an AC electrical network line and an output delivering at least one DC or rectified voltage VC to an inverter or a chopper comprising power semiconductor branches 6, 20-22. At the output of the branches, an electrical cable 4 is connected to an electrical load 3 of the synchronous or asynchronous motor type in order to supply a pulse-mode electrical voltage. A control device 5 for the converter 1, 2 controls the turn-on and turn-off of the semiconductors. The electrical cable 4 comprises for example at least two conductors 4a, 4b, 4c or phases and, more generally, three conductors.

FIG. 3 shows more particularly the structure of a three-level converter 2 of the NPC (Neutral Point Clamped) type, controlled by a control device 5. This converter 2 comprises three branches 20, 21, 22 for producing a three-phase voltage that supplies the electrical load 3 via the electrical cable 4. Each branch 20, 21, 22 comprises the power semiconductors 20a-22d which are controlled so as to supply, on one or more conductors 4a, 4b, 4c of the cable 4, the pulsed voltage to the electrical load 3. The semiconductors 20a-22d are notably metal-oxide semiconductor field-effect or isolated-gate bipolar transistors preferably with an integrated reverse-biased diode.

In this three-level converter 2, a mid-level or intermediate voltage VM is generated at a point common to two capacitors 19A, 19B connected in series between the positive V+ and negative V− voltages of the DC voltage VC.

The three-level converter 2 of the NPC type shown in FIG. 3 is capable of supplying voltage edges comprising three voltage levels in a rising or falling direction and of positive or negative polarity depending on the sign of current output from each branch 20, 21, 22 towards a conductor 4a, 4b, 4c of the cable 4. Depending on whether the edge is rising or falling, the semiconductors 20a-22d are controlled to power up corresponding to the start of conduction and to turn off in order to supply the three voltage levels.

In the case where the current output from the converter 2 is positive, each branch comprises a semiconductor 20A, 21A or 22A able to be controlled to turn on in order to supply a first intermediate positive voltage edge VM, through one of the diodes 24, and to turn off in order to supply a second negative voltage edge from the negative power supply line V− accessible to the diodes of the semiconductors 20B-20D, 21B-21D or 22B-22D. Each branch also comprises a semiconductor 20C, 21C or 22C able to be controlled to turn on in order to supply a second positive voltage edge from the positive power supply line V+ and to turn off in order to supply a first intermediate negative voltage edge VM through one of the diodes 24.

In the case where the current output from the converter is negative, each branch comprises a semiconductor 20B, 21B or 22B able to be controlled to turn on in order to supply a first intermediate negative voltage edge VM through one of the diodes 25, and to turn off in order to supply a second positive voltage edge from the positive power supply line V+ accessible to the diodes of the semiconductors 20A-20C, 21A-21C or 22A-22C. Each branch also comprises a semiconductor 20D, 21D or 22D able to be controlled to turn on in order to supply a second negative voltage edge from the negative power supply line V− and to turn off in order to supply a first intermediate positive voltage edge VM through one of the diodes 25.

Figure 5A:
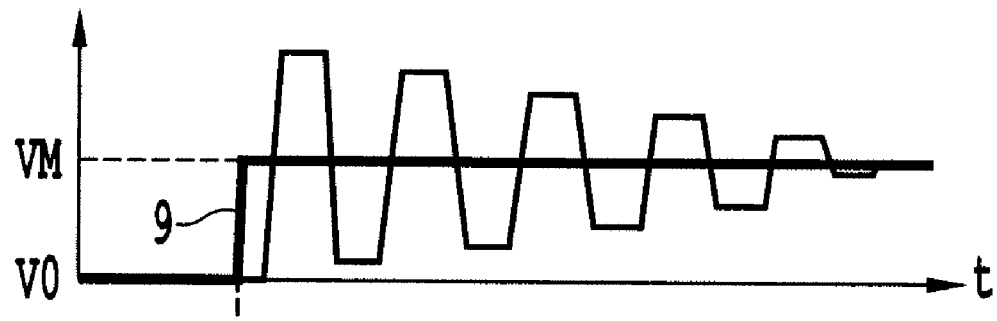
FIGS. 5A, 5B, 5C are plots showing the curves of the voltage signal produced on the electrical cable by a converter with three or more levels, seen from the converter side, and the voltage oscillations generated by this voltage signal on the electrical cable seen from the load side.
Figure 5B:
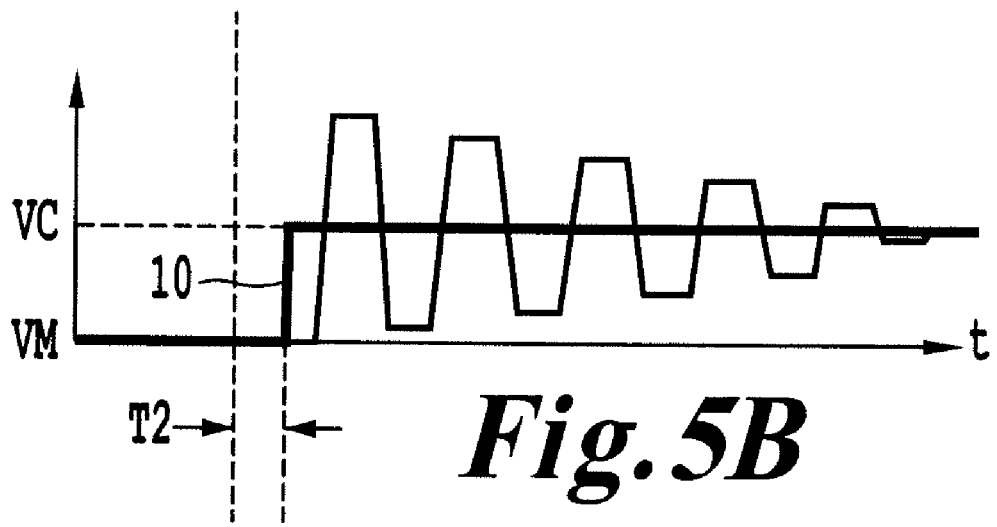
Figure 5C:
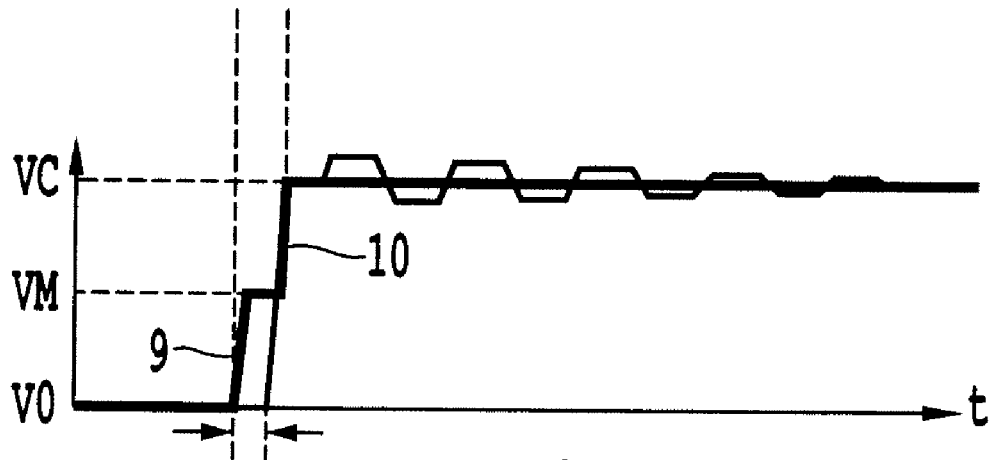
Figure 6A:
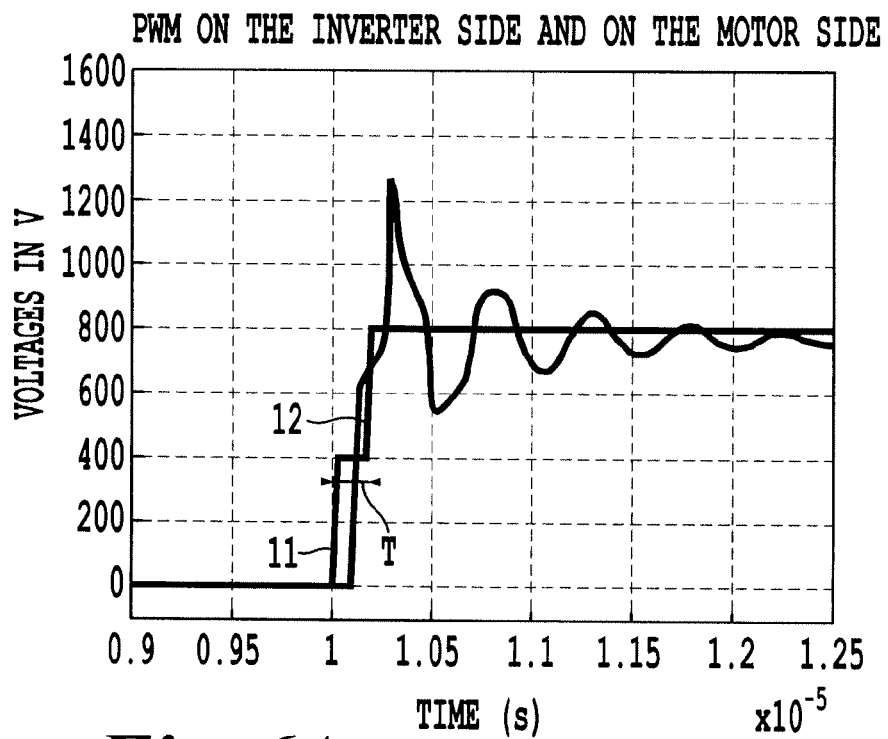
Figure 6B:
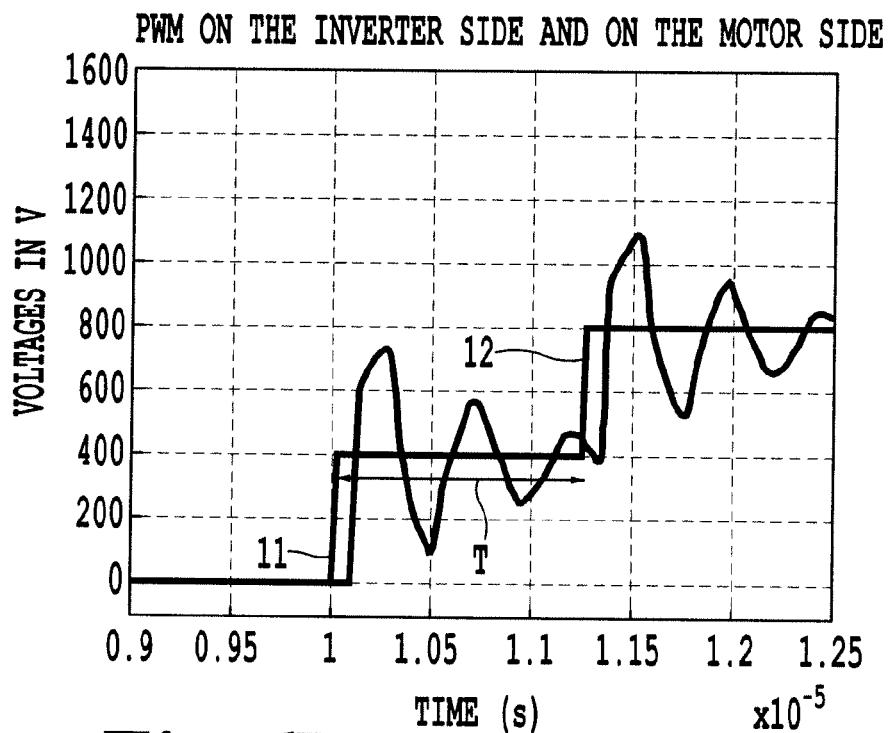
Figure 6C:
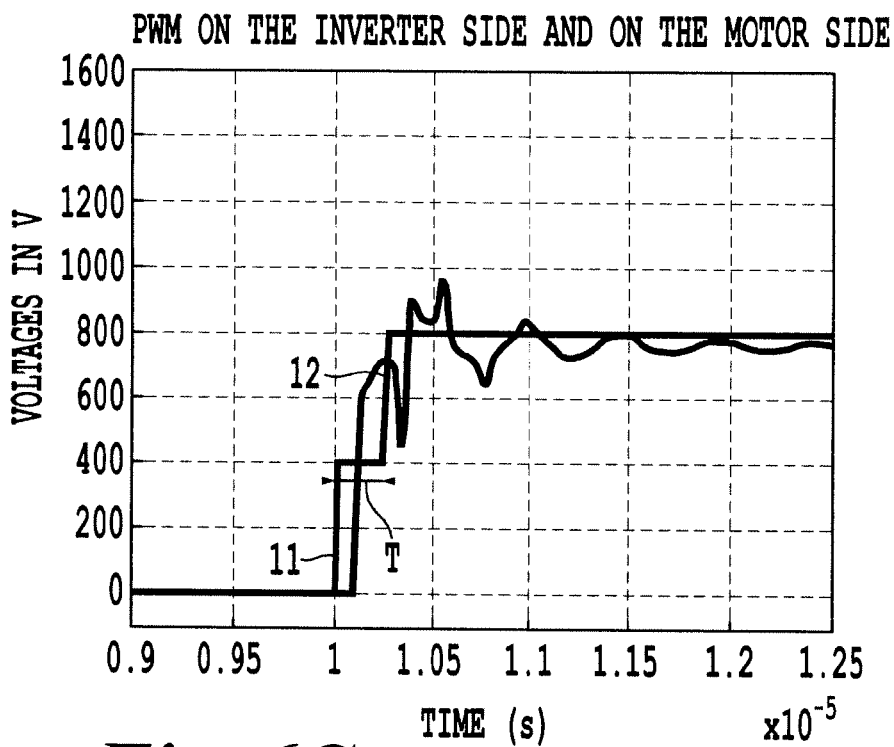
Figure 6D:
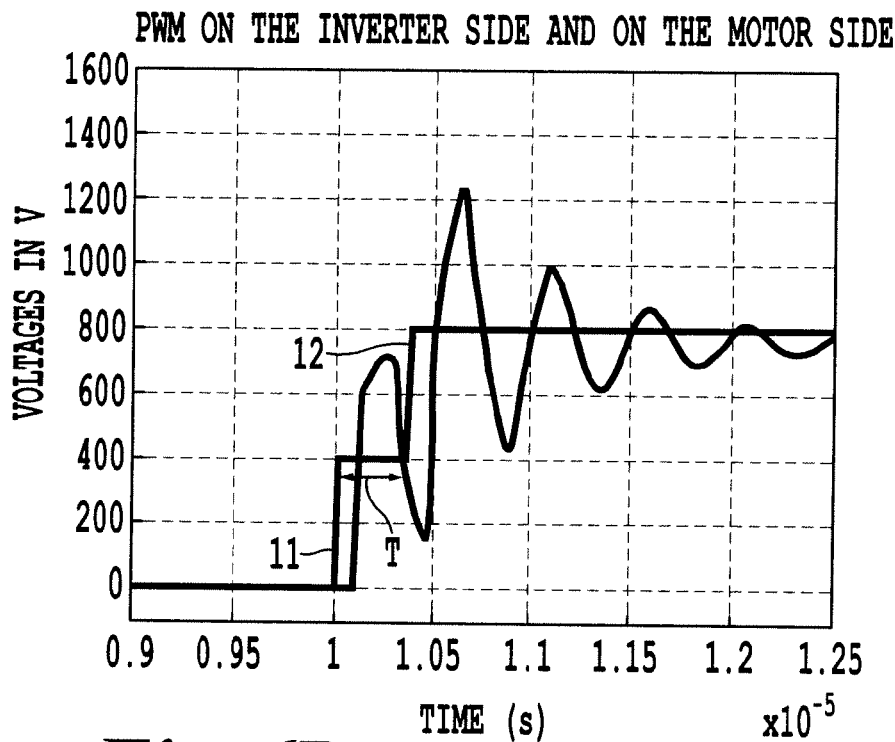
Figure 6E:
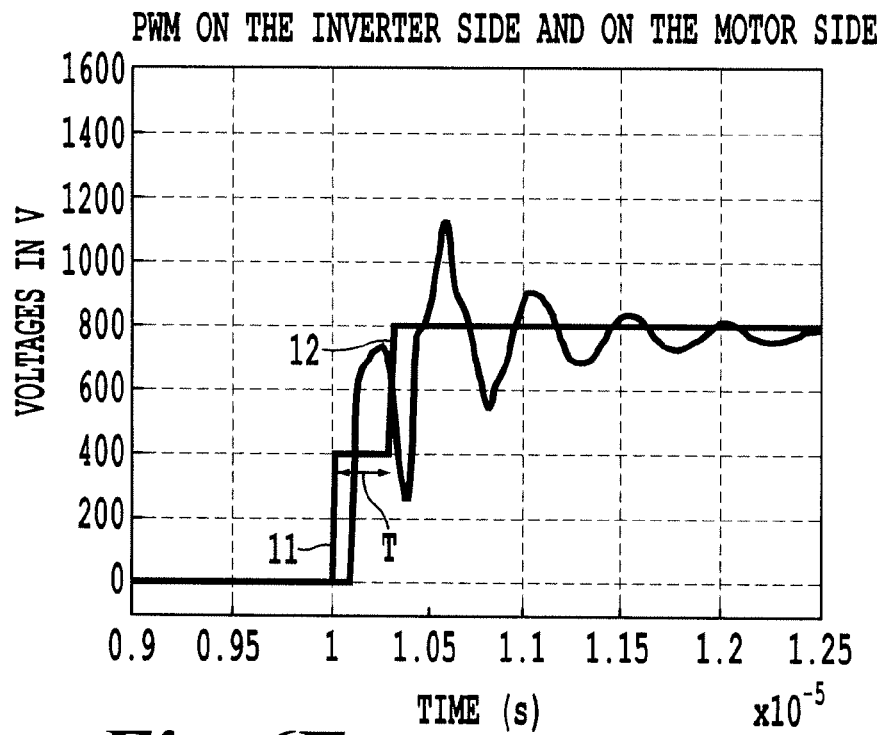
Figure 7A:
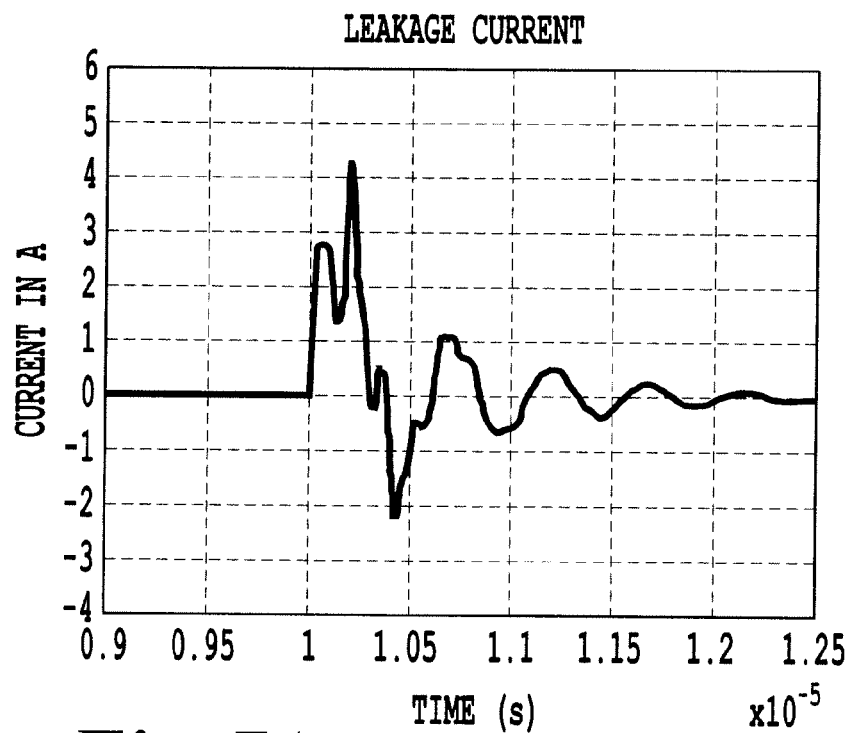
FIGS. 7A to 7E are plots each showing the common-mode current signal measured at the output of the converter on one conductor of the electrical cable as a function of the voltage signal applied to this conductor which are respectively illustrated by the curves in FIGS. 6A to 6E.
Figure 7B:
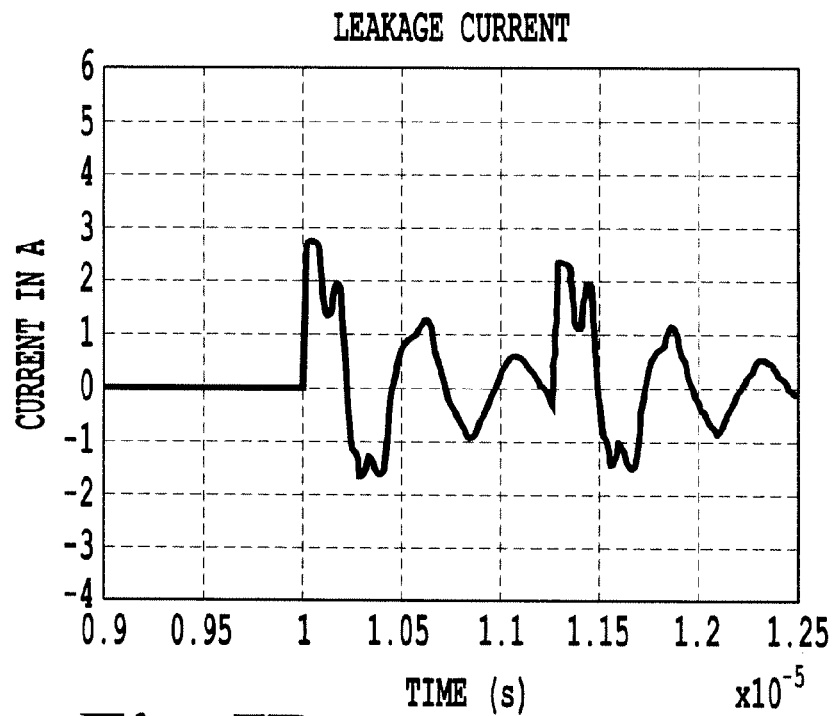
Figure 7C:
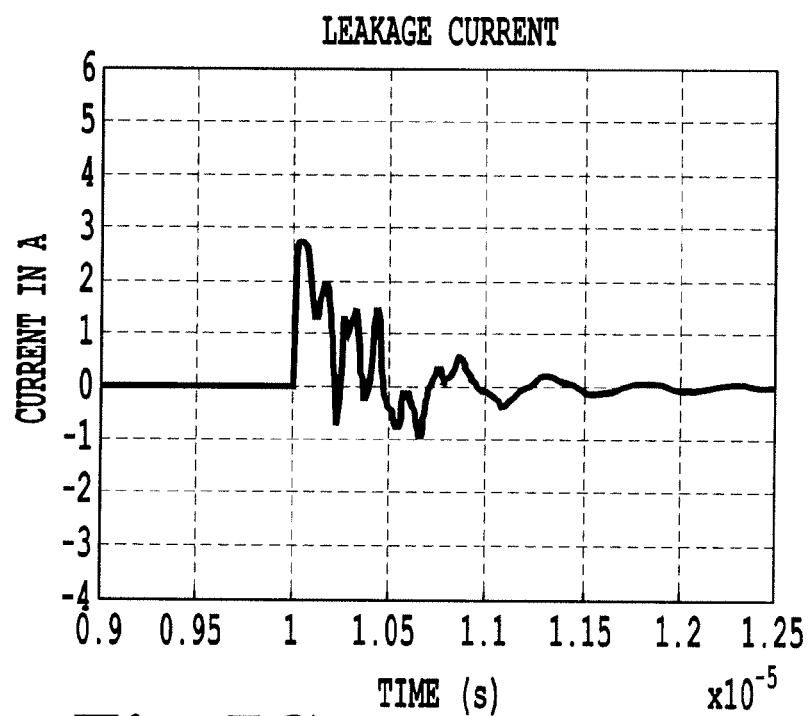
Figure 7D:
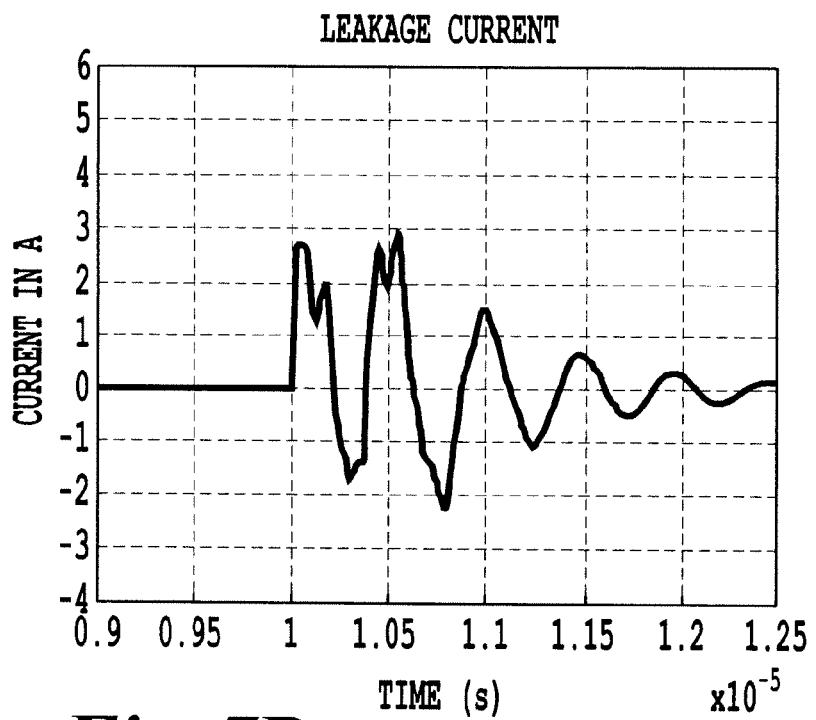
Figure 7E:
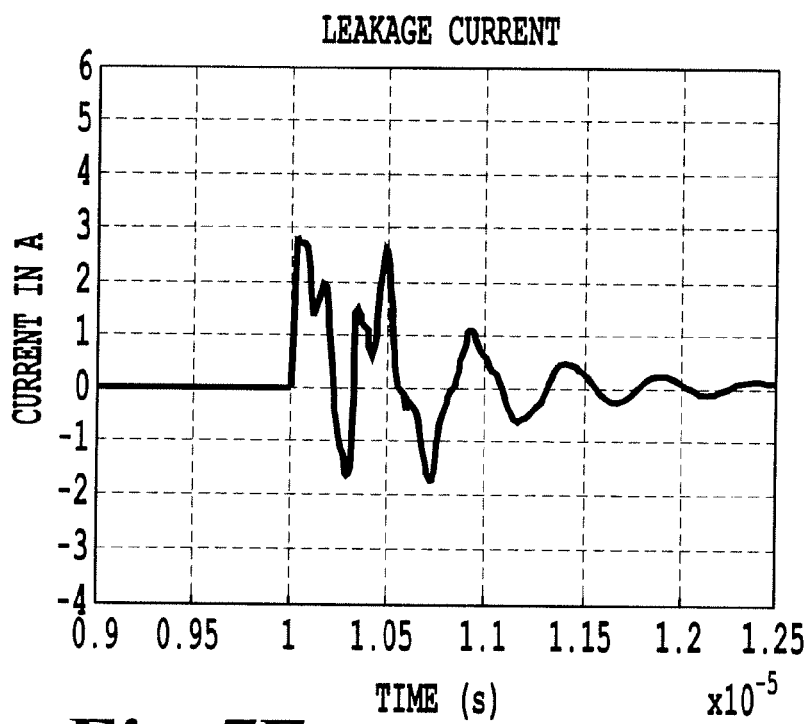

In normal operation of the electrical load 3, the converter 2 is controlled so as to generate a pulsed voltage whose shape allows the reflections of waves on the conductors 4a, 4b, 4c of the electrical cable 4 to be attenuated and the over-voltages across the terminals of the electrical load 3 thus to be limited. As described in the document EP1580873 (or US2005/207194) and with reference to FIG. 5C, this pulsed voltage consists in transmitting over the conductors 4a, 4b, 4c of the cable 4 a first rising edge 9 between a low or zero value V0 and an intermediate value VM lower than a power supply voltage VC (FIG. 5A), then a second rising edge 10 between the said intermediate value VM and a high value substantially equal to the power supply voltage VC after a given delay time T2 (FIG. 5B). The second voltage rising edge is applied with a delay time T2 forming a plateau at the voltage VM which is preferably twice the propagation time Tp of the cable 4, in order to correspond to one forward and backward wave propagation of an edge on the cable 4. In FIG. 3, the control circuit 5 controls the transistors, as a function of a regulation by pulse width 30, and of a parameterization 31 of a propagation time Tp.

According to the invention, the converter 1, 2 comprises processing means 7 allowing the optimal delay time T2 to be observed between the generation of the two voltage edges. The delay time T2 automatically determined by the converter 1, 2 is then stored in the converter. This optimal delay time T2 corresponds to twice the propagation time Tp of a voltage edge on the cable 4. The determination by the converter of the optimal delay time T2 therefore allows it to directly determine the propagation time Tp of the cable. Knowing the propagation time Tp of the cable, with the aid of its processing means 7, the converter can deduce from this the length of the cable 4 using the following formula:

$$Tp = 2\pi\sqrt{L.C}$$

Knowing Tp, it is indeed possible to determine $\sqrt{L.C}$ for the whole length of the cable 4 and hence, using the value of $\sqrt{L_0 C_0}$ per meter of cable (known since indicated by the manufacturer of the cable), to deduce from this the length of the cable 4.

Aside from the ability to minimize the over-voltages across the terminals of the electrical load 3 by applying the process described hereinabove in a converter 2 with three or more levels, the knowledge of the parameters of the cable 4, and notably its length, is also of interest in a converter with two or more levels since it allows the PWM control to be adapted, filters to prevent the over-voltages to be chosen or even to correct for certain parameters of the electrical load 3 such as for example the stator resistance.

The parameterization process according to the invention for the determinations of the optimal delay time and the various characteristics of the cable 4 may be implemented at any time and notably at each change of cable 4 connecting the converter to the electrical load 3.

According to the invention, the parameterization of this delay time T2 in the converter 1, 2 is carried out, prior to it being used in normal operation, by generating common-mode current. The generation of common-mode current is carried out by sending the same signal over one or more conductors 4a, 4b, 4c of the cable 4 while turning off the semiconductors controlling the power supply of the conductor or conductors 4a, 4b, 4c over which no signal is sent.

According to a first embodiment of the invention, a converter 2 with three or more levels is controlled so as to generate in the same pulse direction, positive or negative, a pulsed voltage comprising two successive voltage edges 11, 12 on one conductor 4a of the electrical cable 4, the transmission of the second voltage edge being delayed by a delay time T with respect to the first voltage edge (FIGS. 6A to 6E). A first voltage rising edge 11 is for example formed between a first low or zero value V0 and an intermediate value VM such as for example half the power supply voltage, then after a voltage plateau at the intermediate value lasting a certain delay time T, the second voltage rising edge 12 is transmitted between the intermediate value VM and a final value higher than the intermediate value and substantially equal to the power supply voltage VC.

Figure 4:
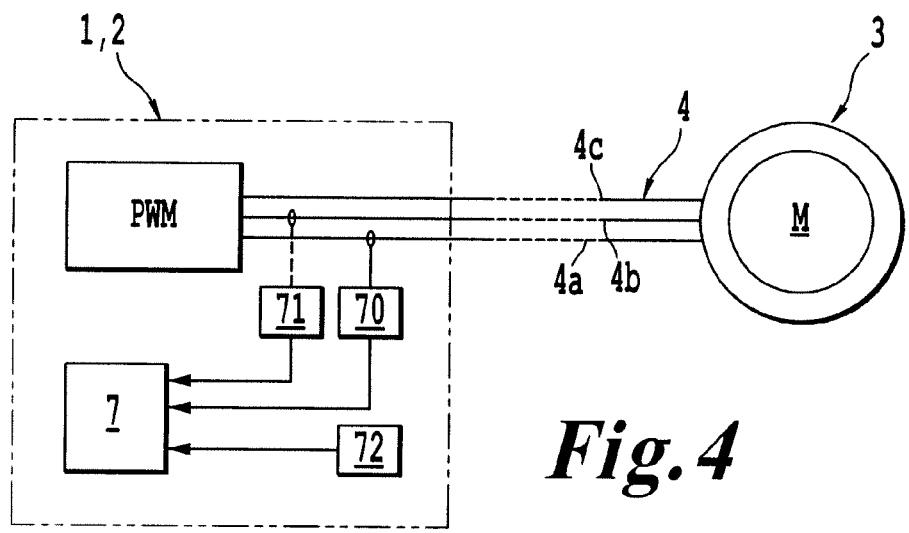
FIG. 4 shows simplified diagrams of the installations in FIGS. 2 and 3.

A current sensor 70 (FIG. 4) placed on the conductor 4a is used to measure the common-mode current generated by the succession of the two voltage edges 11, 12 separated by the delay time T. This operation is reproduced several times successively each time observing a different delay time T between the two voltage edges 11, 12 (FIGS. 6A to 6E). For each pulse composed of two voltage edges 11, 12 separated by a different delay time T, the common-mode current generated is measured (FIGS. 7A to 7E) by means of the current sensor 70 placed on the conductor 4a.

The curves shown in FIGS. 7A to 7E show the common-mode current signal measured for various values of the delay time T observed between the two voltage edges 11, 12.

The converter 2 comprises processing means 7 comprising a peak detector allowing the corresponding peak current Ipeak to be determined for each signal of the measured common-mode current. In another configuration, the processing means 7 can comprise an r.m.s. current detector formed by a current rectifier and by an integrator allowing, for each measured common-mode current signal, the r.m.s. intensity to be determined according to the known formula:

$$Ieff = \sqrt{\frac{1}{T} \cdot \int_{t}^{t+T} i^2(t) \cdot dt}$$

Figure 9:
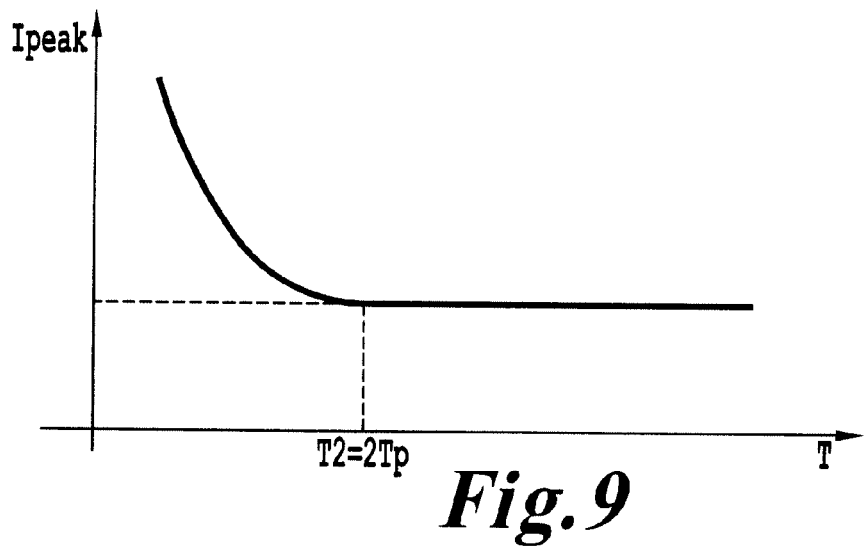
FIG. 9 shows a simplified curve profile representing the variation of the peak intensity of the common-mode current as a function of the delay time observed between the transmission of the two voltage edges.
Figure 10:
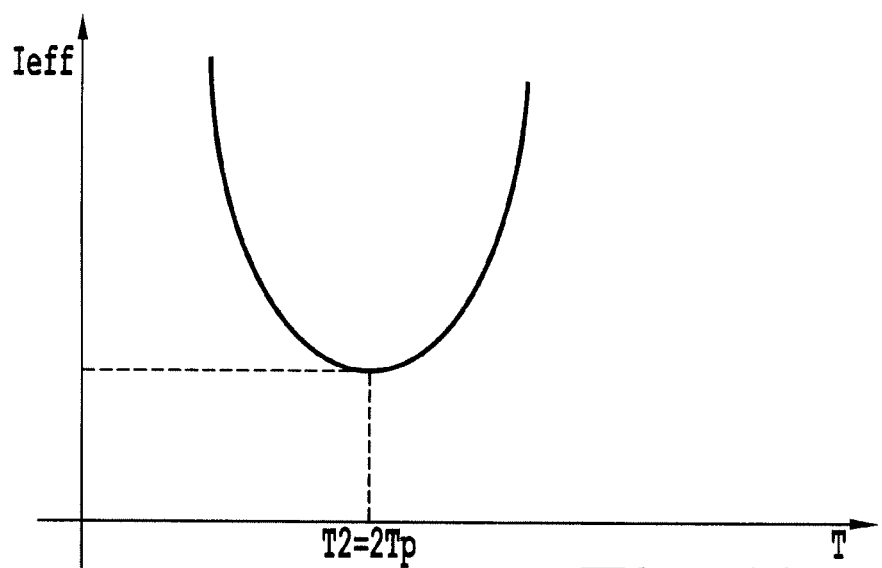
FIG. 10 shows a simplified curve profile representing the variation of the r.m.s. intensity of the common-mode current as a function of the delay time observed between the transmission of the two voltage edges.

FIG. 9 shows the profile of the curve illustrating the variation of the peak intensity Ipeak of the common-mode current as a function of the values of delay time T observed between the two voltage edges 11, 12. Similarly, FIG. 10 shows the curve profile illustrating the variation of the r.m.s. intensity Ieff of the common-mode current as a function of the delay time T observed between the two voltage edges 11, 12.

Finally, the optimal delay time T2 is determined from the peak intensities Ipeak or from the r.m.s. intensities Ieff determined as a function of the delay time T observed between the two voltage edges 11, 12. The processing means 7 determine the slope break point of the peak intensities Ipeak when the delay time T increases (Ic opt in FIG. 9) or the minimum of the r.m.s. intensities Ieff (Ieff opt in FIG. 10). The delay time T corresponding to the slope break point of the peak intensities Ipeak when the delay time T increases or to the minimum of the r.m.s. intensities Ieff corresponds to the optimal delay time T2 sought. This delay time T2 is stored in the converter 2 and must be observed in normal mode of operation between two successive voltage edges 9, 10 with a view to avoiding the over-voltages across the terminals of the electrical load 3.

Figure 8A:
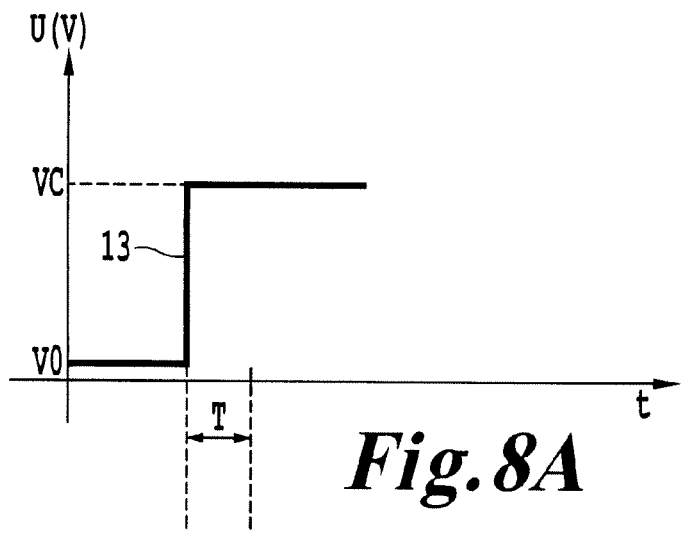
FIGS. 8A and 8B show plots on each of which is shown the voltage signal transmitted over one individual conductor of the cable by means of a converter with two or more levels.
Figure 8B:
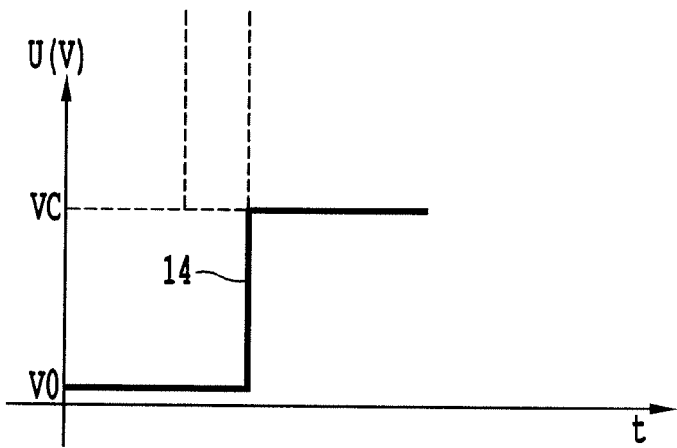

According to a second embodiment of the invention, a converter 1, 2 with two or more levels is controlled so as to send, in the same pulse direction, positive or negative, a first voltage edge 13 over a first conductor 4a of the electrical cable 4 between a first low or zero value V0 and a final value for example substantially equal to the power supply voltage VC of the load 3 (FIG. 8A), then a second voltage edge 14 identical to the first over a second conductor 4b of the cable 4, between the same initial low or zero value V0 and the same final value substantially equal to the power supply voltage of the load VC (FIG. 8B). A delay time T is observed between the transmission of the two voltage edges 13, 14. According to this variant embodiment, the common-mode current generated by the two voltage edges 13, 14 is measured by using one or two current sensors 70, 71.

A single current sensor 70 (FIG. 4) may suffice if the first and the second conductors 4a, 4b receiving the two voltage edges 13, 14 are sufficiently close together. The action of the second voltage edge 14 transmitted on the second conductor 4b then affects the measurement of the common-mode current generated on the first conductor 4a by capacitive coupling. The totality of the common-mode current generated by the two voltage edges 13, 14 is measured by the current sensor 70. In contrast, if the two conductors 4a, 4b are isolated from one another, two current sensors 70, 71 (FIG. 4) are used. A first current sensor 70 placed on the first conductor 4a allows the common-mode current generated by the first voltage edge 13 on the first conductor 4a to be measured and a second current sensor 71 allows the common-mode current generated by the second voltage edge 14 on the second conductor 4b to be measured. The processing means 7 comprise a summer allowing the common-mode currents measured by each current sensor 70, 71 to be subsequently added together.

As described in the first embodiment, the delay time T between the two voltage edges 13, 14 is varied. The common-mode current measured for each value of delay time T is then processed by the processing means 7 in order to extract from it, for each value of delay time T, either the peak intensity Ipeak or the r.m.s. intensity Ieff as previously described.

The determination of the optimal delay time is carried out starting from the values of peak intensity Ipeak or of r.m.s. intensity Ieff that were determined. The curve profiles obtained are those shown in FIGS. 9 and 10 that were previously described. The optimal delay time T2 is the corresponding value at the slope break point of the peak intensities Ipeak when the delay time T increases (Ic opt in FIG. 9) or at the minimum of the r.m.s. intensities Ieff (Ieff opt in FIG. 10). Observing this optimal delay time T2 between two successive voltage edges 9, 10 sent by a converter 2 with three or more levels allows the over-voltages across the terminals of the electrical load 3 in normal mode of operation to be limited.

According to one variant embodiment to these two embodiments implemented by means of a converter with two or more levels, the optimal delay time T2 is determined after the transmission of one voltage edge 15 on one conductor 4a of the cable 4 and the high-impedance setting of the converter 1, 2 in order to generate a reflection voltage edge 16 (FIG. 11) on the same conductor 4a.

According to this variant, the converter 1, 2 is controlled so as to send a voltage edge 15 over at least one conductor 4a of the cable 4. In view of the high impedance of the electrical load 3, this voltage edge 15 is partly reflected on the load 3 which creates voltage oscillations on the conductor 4a. The converter 1, 2, which normally exhibits a low, or even zero, impedance, is then set in high-impedance mode by turning off the semiconductors controlling the power supply of the conductor 4a. The setting at high impedance of the converter 1, 2 therefore leads to a new reflection of the voltage edge on the converter 1, 2 which generates a new voltage edge 16 on the conductor 4a propagating towards the load 3.

By means of a voltage sensor 72 (FIG. 4) implanted in the speed controller, the variations in the voltage generated by the transmission of the voltage edge 15 controlled by the converter 1, 2 are measured. Two different processing operations of the voltage signal obtained may be implemented by the processing means 7 in order to determine the optimal delay time T2.

Figure 11:
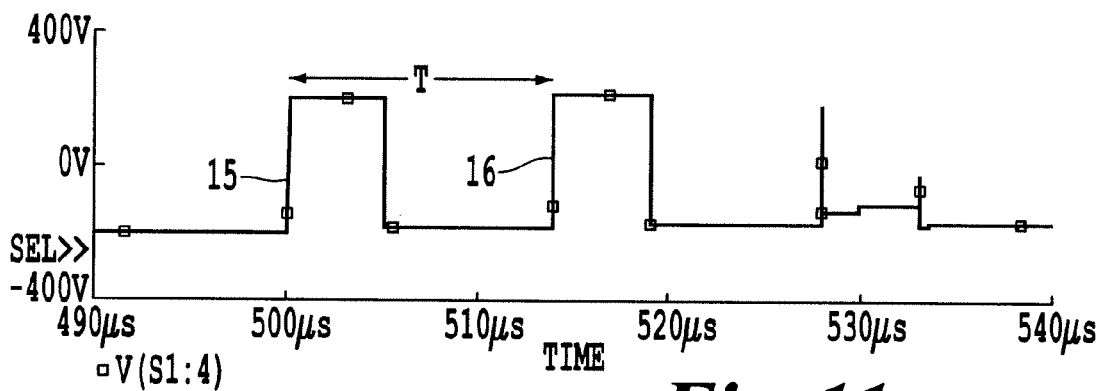
FIG. 11 shows the signal of the voltage obtained after the transmission of a voltage edge towards the load and a reflection of this voltage edge on the converter set in a high-impedance state.
Figure 12:
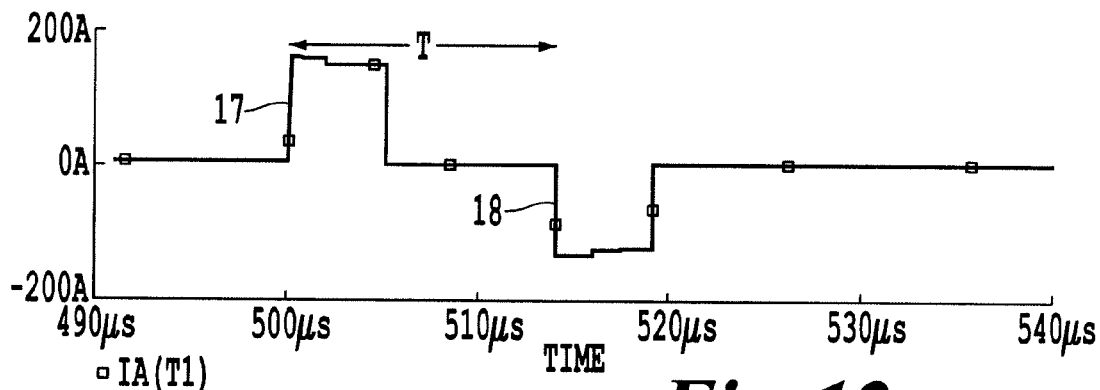
FIG. 12 shows the intensity signal obtained for certain types of cables, after the transmission of a voltage edge towards the load and a reflection of this voltage edge on the converter set in a high-impedance state.

A first processing operation consists in, from the voltage signal shown in FIG. 11, triggering a clock at the moment of the transmission of the first voltage edge 15 and in detecting the moment when this voltage edge 16 is reflected on the converter 1, 2 then in high-impedance mode. The time delay separating these two moments corresponds to one return journey on the conductor 4a of the electrical cable 4 and hence corresponds to twice the propagation time Tp of a voltage edge on the cable 4. This time delay therefore corresponds to the optimal delay time T2 to be observed between the generation of two successive voltage edges 9, 10 during the normal mode of operation of the electrical load 3 in order to limit the over-voltages across the terminals of this load 3.

The second processing operation consists in determining the r.m.s. voltage Ueff starting from the voltage signal captured by the voltage sensor 72. The measured voltage is rectified and integrated in order to deduce the r.m.s. voltage Ueff from it using the following known formula:

$$Ueff = \sqrt{\frac{1}{T} \cdot \int_{t}^{t+T} u^2(t) \cdot dt}$$

The r.m.s. voltage Ueff is therefore determined by integrating the rectified voltage measured on the conductor 4a, and the amplitude of the voltage defined above by Vc may be known by an independent measurement of the DC voltage on the speed controller bus. This amplitude is the voltage applied over the period T. Ueff and the voltage Vc are known over the period T from the above formula, so that T, which corresponds to the optimal delay time T2 sought and to twice the propagation time Tp of the cable 4, may be deduced.

By using a current sensor 70 placed on the conductor 4a over which the first voltage edge 15 has been sent in place of the voltage sensor 72, the current I, generated by the transmission of this voltage edge 15 and by the reflection of this voltage edge 15 on the converter 1, 2 following its setting in high-impedance mode, may also be measured. The signal obtained is shown in FIG. 11. Depending on certain characteristics of the electrical cable employed, and notably depending on its resistance, the reflection on the converter can take place with a coefficient greater than 0 which allows a current I corresponding to the reflection of the voltage edge 16 to be detected. The transmission of the first voltage edge 15 is visible on the curve in FIG. 11 as a first intensity pulse 17 and the voltage edge reflected 16 on the converter 1, 2, then in high-impedance mode, is visible as the second intensity pulse 18 which is negative. The processing means 7 comprise a clock measuring the time that has passed between the detection of these two intensity pulses. This time corresponds to twice the propagation time Tp of the cable 4 and hence to the optimal delay time T2 sought.

It will be understood that other variants and improvements in detail may be imagined, and even the utilization of equivalent means be envisaged, without straying from the scope of the invention.

The invention claimed is:

1. A method for configuring an inverter connected to an electrical motor by an electrical connection between the inverter and the electrical motor, the method comprising:
    generating a plurality of common-mode currents by applying a plurality of stepped voltages delivered by the inverter to the electrical motor through the electrical connection, the plurality of stepped voltages including a first rise to a first voltage level, and a second rise to a second voltage level, a time difference between time instances of the first and second rise being an interval T that is varied;
    measuring the plurality of common-mode currents of said generating;
    calculating at least one of peak currents or effective currents from the plurality of common-mode currents; and
    determining an optimal delay time for an application of two consecutive voltage steps generated by the inverter applied to the electrical motor based on at least one of the effective currents or the peak currents of said calculating.

2. The method for configuring an inverter according to claim 1, wherein in said generating, the first rise to the first voltage level is generated on a conductor of the electrical connection of the electrical motor from an initial voltage level to the first voltage level, and the second rise to the second voltage level is generated on said conductor of the electrical connection from the first voltage level to the second voltage level.

3. The method for configuring an inverter according to claim 1, wherein in said generating, the first rise to the first voltage level is generated on a first conductor of the electrical connection of the electrical motor from an initial voltage level to the first voltage level, and the second rise to the second voltage level is generated on a second conductor of the electrical connection from the initial voltage level to the second voltage level.

4. The method for configuring an inverter according to claim 1, wherein said determining further comprises:
    calculating the optimal delay time for the application of two consecutive voltage steps by detecting a slope break point of the peak currents with an increasing duration of the interval T.

5. The method for configuring an inverter according to claim 1, wherein said determining further comprises:
    calculating the optimal delay time for the application of two consecutive voltage steps by detecting a minimum of the effective currents for different intervals of the interval T.

6. The method for configuring an inverter according to claim 1, further comprising:
    calculating a propagation time of the electrical connection between the inverter and the electrical motor by dividing the optimal delay time by 2.

7. The method for configuring an inverter according to claim 1, further comprising:
    calculating a length of the electrical connection between the inverter and the electrical motor based on the optimal delay time.

8. An inverter configured to connect to an electrical motor by an electrical connection that can be located between the inverter and the electrical motor, the inverter comprising:
    a switch pattern generator configured to generate a plurality of common-mode currents by applying a plurality of stepped voltages by the inverter to the electrical motor through the electrical connection, the plurality of stepped voltages including a first rise to a first voltage level, and a second rise to a second voltage level, a time difference between time instances of the first and second rise being an interval T that is varied;
    a measurement unit configured to measure the plurality of common-mode currents; and
    a processing unit configured to calculate at least one of peak currents or effective currents from the plurality of common-mode currents, and configured to determine an optimal delay time for an application of two consecutive voltage steps generated by the inverter applied to the electrical motor based on at least one of the calculated effective currents or calculated peak currents.

9. The inverter according to claim 8, wherein the inverter is configured to generate three or more levels, and
    the switch pattern generator is further configured to generate the first rise to the first voltage level on a conductor of the electrical connection of the electrical motor from an initial voltage level to the first voltage level, and to generate the second rise to the second voltage level on said conductor of the electrical connection from the first voltage level to the second voltage level.

10. The inverter according to claim 9, wherein said measurement unit includes a current sensor configured to measure a phase current of the electrical connection.

11. The inverter according to claim 8, wherein the inverter is configured to generate two or more levels, and
    the switch pattern generator is further configured to generate the first rise to the first voltage level on a first conductor of the electrical connection of the electrical motor from an initial voltage level to the first voltage level, and to generate the second rise to the second voltage level on a second conductor of the electrical connection from the initial voltage level to the second voltage level.

12. The inverter according to claim 11, wherein said measurement unit includes:
    two current sensors configured to measure two phase currents of the electrical connection; and
    an adder configured to add the common-mode currents of the two measured phase currents.

13. The inverter according to claim 8, wherein said processing unit is further configured to calculate the optimal delay time for the application of two consecutive voltage steps by detecting a slope break point of the peak currents with an increasing duration of the interval T.

14. The inverter according to claim 8, wherein said processing unit is further configured to calculate the optimal delay time for the application of two consecutive voltage steps by detecting a minimum of the effective currents for different intervals of the interval T.

15. The inverter according to claim 8, wherein said processing unit is further configured to calculate a propagation time of the electrical connection between the inverter and the electrical motor by dividing the optimal delay time by 2.

16. The inverter according to claim 8, wherein said processing unit is further configured to calculate a length of the electrical connection between the inverter and the electrical motor based on the optimal delay time.

* * * * *